No. 661,909. Patented Nov. 13, 1900.
T. FOSTER.
FRICTION GEARING.
(Application filed June 5, 1900.)
(No Model.) 2 Sheets—Sheet 1.

Witnesses: Inventor:
L. C. Hills. Thomas Foster
John Chalmers Helm By Wilkinson & Fisher
Attys.

THE NORRIS PETERS CO., PHOTO-LITHO., WASHINGTON, D. C.

No. 661,909. Patented Nov. 13, 1900.
T. FOSTER.
FRICTION GEARING.
(Application filed June 5, 1900.)
(No Model.) 2 Sheets—Sheet 2.
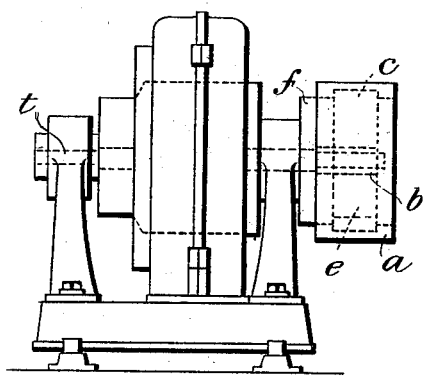
Fig. 3.
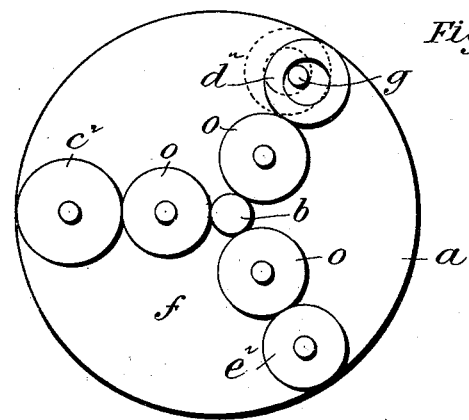
Fig. 6.
Fig. 4.
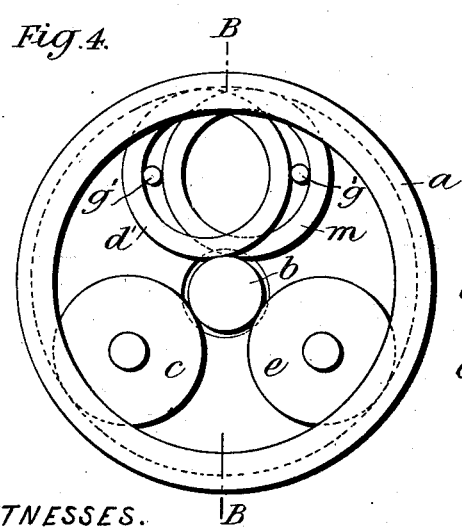
Fig. 5.
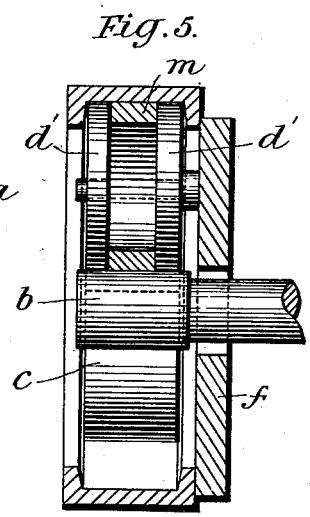
WITNESSES.
Franck Buckley Lowe
Frederick Joughton
INVENTOR.
Thomas Foster

UNITED STATES PATENT OFFICE.

THOMAS FOSTER, OF MANCHESTER, ENGLAND.

FRICTION-GEARING.

SPECIFICATION forming part of Letters Patent No. 661,909, dated November 13, 1900.

Application filed June 5, 1900. Serial No. 19,155. (No model.)

*To all whom it may concern:*

Be it known that I, THOMAS FOSTER, a subject of the Queen of Great Britain, residing at Manchester, in the county of Lancaster, England, have invented a certain new and useful Improvement in Friction-Gearing, of which the following is a specification.

My invention consists of apparatus for the transmission of power by rolling contact and to means for maintaining the parts of which the gearing is composed in the necessary contact, my invention relating to gearing of the class where the pressure between the surfaces of a system of rollers is taken up and balanced by an outer ring or annular wheel, the internal wall of which forms one of the rolling surfaces.

The object of my invention is to provide an extremely simple and effective friction-gearing suitable for reduction or increase of speed.

For the purpose of making the invention clear I will describe it with reference to the accompanying drawings, in which—

Figure 1:
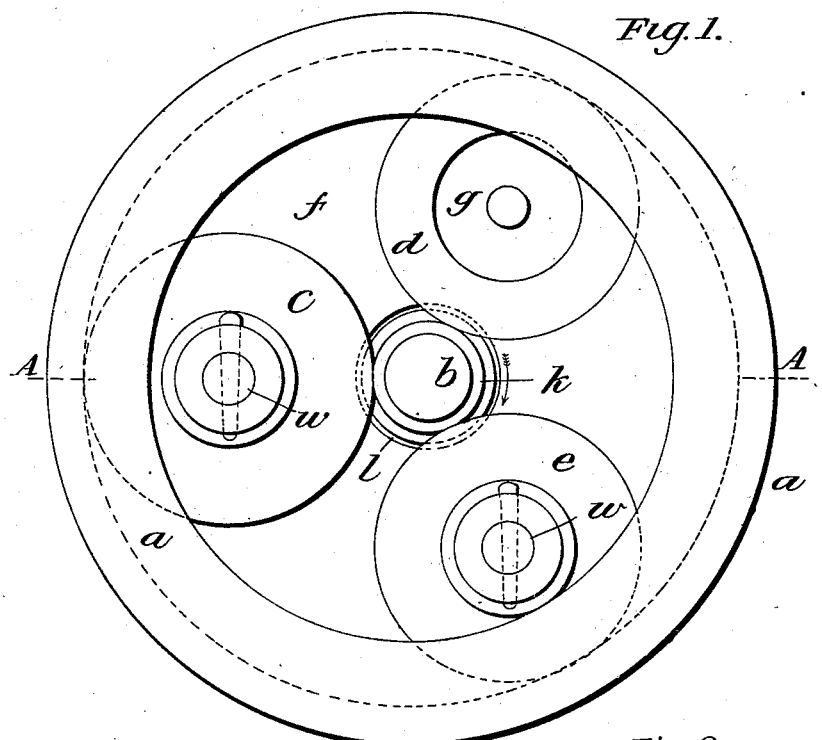
Figure 2:
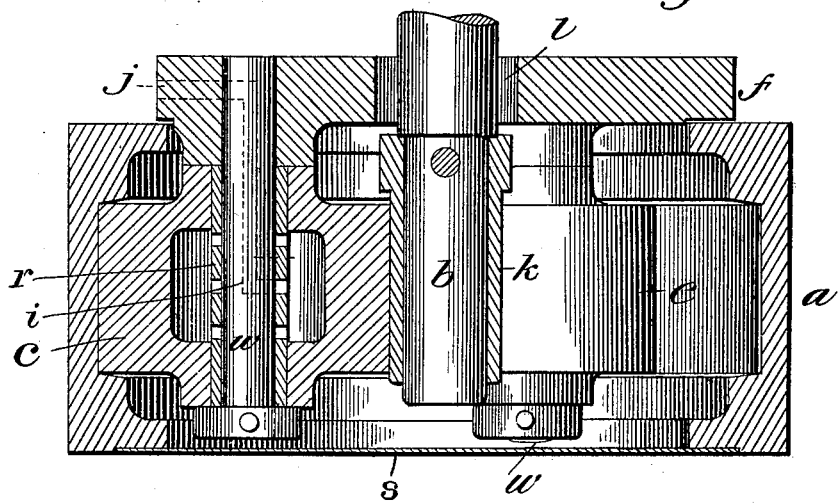

Figure 1 is an end view of one form of gearing. Fig. 2 is a section through same on line A A. Fig. 3 is a view, on a reduced scale, of a motor and the gearing applied thereto. Fig. 4 is a similar view to Fig. 1, but on a smaller scale, to show a modification. Fig. 5 is a section on line B B of Fig. 4. Fig. 6 is a similar view to Fig. 1 to illustrate a further modification.

In Figs. 1 and 2 I show a simple form of friction-gearing, in which $a$ is an outer annular ring or wheel, which may form part of a pulley for a belt or be connected by coupling to a suitable shaft, $b$ is a shaft, and $c\ d\ e$ are transmission-rollers, all of the parts having parallel friction-surfaces. The rollers $c$ and $e$ are carried on studs $w$, fixed in a frame $f$, which may be the end plate of a motor, or be otherwise suitably held, while the roller $d$ is entirely loose and free to move around the central shaft $b$, though it is preferably provided with a pin $g$, secured in the end plate or frame $f$, which passes into a central opening of same to limit its movement, as hereinafter described. To allow of sufficient movement, this roller is usually made ring-shaped, as shown.

It will be seen that the roller $c$ is of a larger diameter than rollers $d\ e$; but the loose roller $d$ may be of the larger diameter or two rollers may be large and one small, the object being to enable the loose roller to wedge between the central shaft $b$ and the interior surface of the annular ring $a$ when the central shaft is rotating in one direction, though it is loosened, so that no driving takes place when the shaft rotates in the opposite direction. This ring $a$ in the arrangement shown forms a pulley and is grooved internally and carries a dust or inclosing plate $s$. Each stud $w$ carries a perforated sleeve $r$ and is also preferably provided with a passage $i$, connected with a passage $j$ in the end plate $f$ and through which oil may be supplied to a recess in the wheels $c\ e$, such recess being preferably filled with fibrous material to hold the oil. The motor-shaft $b$ is preferably provided with a hardened-steel sleeve $k$, secured thereto, and such shaft passes through a large opening $l$ in the end plate $f$, so that its only bearing at this end is upon the rollers $c\ d\ e$, which thus form a roller-bearing for said shaft. The shaft carries the armature and has the usual bearing at the other end, as shown at $t$ in Fig. 3. By reason of the different sizes of the rollers $c\ d\ e$ the motor-shaft is not central with the pulley or ring $a$, though it drives same in a circular path. It will be seen that in the case of a high-speed motor a reduction-gearing is thus provided of a very simple type, the action consisting in the shaft when rotating in the direction of the arrow forcing the loose roller $d$ into the smaller space between it and the ring or pulley $a$, so that such roller commences to drive as it grips the two, and thus causes the other rollers to transmit motion also. With this arrangement no driving can take place when the shaft rotates in the opposite direction, as it would tend to move the loose roller into the larger space and would therefore release all pressure on same.

If driving is desired in both directions, as may be the case for traction-work and other purposes, two or more loose rollers are employed, as shown in Figs. 4 and 5, where the arrangement consists of two rings or hollow rollers $d'\ d'$, in this case of larger size than the rollers $c'\ e'$, which are arranged so as to fall into the smaller space when the shaft $b$ drives in one direction, and a single hollow roller $m$ of the same diameter as and situated between the rollers $d'\ d'$, adapted to fall into the smaller space when the shaft drives in the other direction, so that either rollers $d'\ d'$ or $m$ do the gripping, according to the direction in which the shaft rotates. The pins $g'\ g'$ act, as in the case of the other pin $g$, to prevent the rollers from getting out of the right position for gripping. These loose rollers may be arranged as shown—that is, one wide one, $m$, in the middle to grip in one direction and two narrow ones, $d'\ d'$, at the two sides to grip in the opposite direction, or there may be simply two of them (one for each direction) set side by side, each half the width of the groove or interior of the ring or pulley $a$.

In the arrangement shown in Figs. 1 and 2 one set of three friction-transmission rollers is shown, but more than one may be employed. For instance, they may be arranged in two sets of three, as shown in Fig. 6, in radial lines from the center shaft or roller $b$, the first set consisting of a series of three rollers $o\ o\ o$ of equal size which bear against the shaft or roller $b$ and the second set of rollers $c^2\ d^2\ e^2$, as in Fig. 1, each of such rollers bearing on a roller $o$ and on the ring or pulley $a$, the loose roller $d^2$ falling down into the smaller space caused by the increased size of roller $c^2$ when the driving takes place in that direction.

It will be understood that by making one or more of the rollers of larger size than the others the wear is enabled to be taken up by the loose roller or rollers and the necessary pressure is obtained between all the rolling surfaces to keep them in the desired frictional contact.

In place of being formed as a pulley adapted to take a belt the ring $a$ may be formed as a spur or bevel gearing or, as stated, it may form part of a coupling connected to the driven shaft, or, as will be readily understood, in place of the roller or shaft $b$ doing the driving it may be the driven part, the power being applied to the ring $a$.

What I claim is—

1. In a friction-gearing, the combination with a revoluble shaft, a frame loosely encircling said shaft, and rollers mounted on said frame engaging said shaft; of a ring encircling said rollers, a loose roller also within said ring, one of said rollers being of a different size from the other rollers, substantially as described.

2. In a friction-gearing, the combination with a revoluble shaft, a frame loosely encircling said shaft, and rollers mounted on said frame engaging said shaft; of a ring encircling said rollers, a loose hollow roller within said ring and engaging said ring and shaft, one of said rollers being of a different size from the other rollers, and a stud on said frame entering the said hollow roller, substantially as described.

3. In a friction-gearing, the combination with a revoluble shaft, a frame loosely encircling said shaft, and rollers mounted on said frame engaging said shaft; of a ring encircling said rollers, loose hollow rollers within said ring engaging said ring and shaft, said loose hollow rollers being of a different size from the other rollers, and studs on said frame entering said hollow rollers, substantially as described.

4. In friction-gearing, the combination with a revoluble shaft; a frame loosely encircling said shaft; and a ring also encircling the shaft; of a self-tightening roller loosely carried between the shaft and the ring; and two other motion-transmitting rollers revolving on fixed centers, and so disposed as to act as antifriction-roller bearings for said shaft, substantially as described.

In testimony whereof I have hereunto set my hand in the presence of two subscribing witnesses.

THOMAS FOSTER.

Witnesses:
ARTHUR HOLT,
FRANK SMITH.